O. G. RIESKE.
DOUBLE DISK ATTACHMENT FOR SEED DRILLS.
APPLICATION FILED JAN. 18, 1912.

1,076,998.

Patented Oct. 28, 1913.

2 SHEETS—SHEET 1.

Witnesses.
A. H. Opsahl.
E. C. Skinkle

Inventor.
Otto G. Rieske
By his Attorneys
Williamson & Merchant

O. G. RIESKE.
DOUBLE DISK ATTACHMENT FOR SEED DRILLS.
APPLICATION FILED JAN. 18, 1912.
1,076,998.
Patented Oct. 28, 1913.
2 SHEETS—SHEET 2.
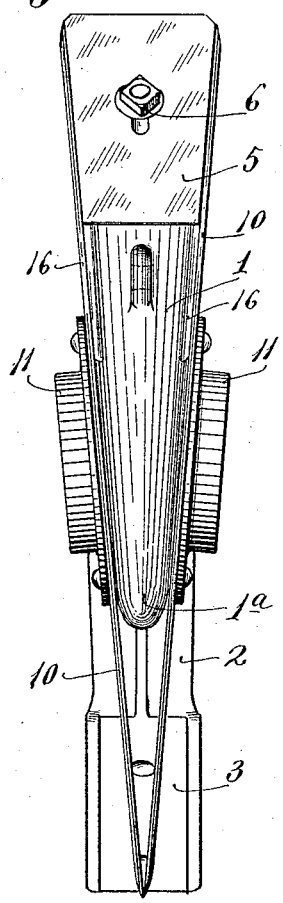
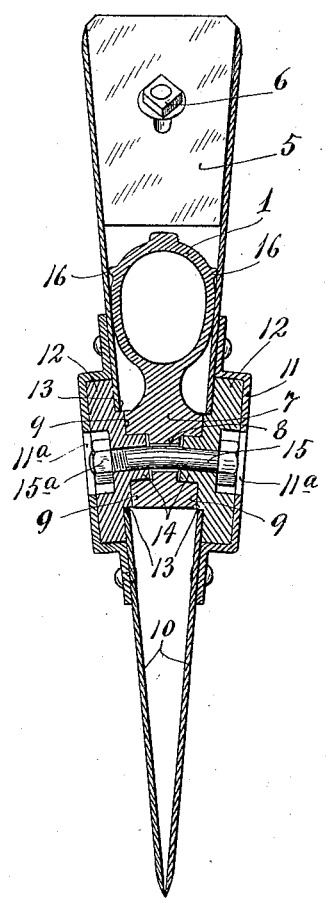
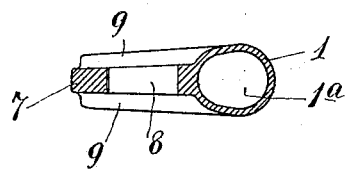
Witnesses
a. H. Opsahl
E. C. Skinkle
Inventor
Otto George Rieske
By his Attorneys
Williamson Merchant

UNITED STATES PATENT OFFICE.

OTTO GEORGE RIESKE, OF BEAVER DAM, WISCONSIN, ASSIGNOR TO ALBERT J. EUCHENHOFNER, OF INDIANAPOLIS, INDIANA.

DOUBLE-DISK ATTACHMENT FOR SEED-DRILLS.

1,076,998.           Specification of Letters Patent.       Patented Oct. 28, 1913.

Application filed January 18, 1912. Serial No. 671,882.

*To all whom it may concern:*

Be it known that I, OTTO GEORGE RIESKE, a citizen of the United States, residing at Beaver Dam, in the county of Dodge and State of Wisconsin, have invented certain new and useful Improvements in Double-Disk Attachments for Seed-Drills; and I do hereby declare the following to be a full, clear, and exact description of the invention, such as will enable others skilled in the art to which it appertains to make and use the same.

This invention relates to double disk attachments for seed drills, and has for its object to simplify and improve the same in the several particulars hereinafter noted.

Particularly, the invention is in the nature of an improvement on the double disk attachment disclosed and claimed in my copending application, S. N. 605,455, filed January 30th, 1911, and entitled "Double disk attachment for seed drills."

In the present application, as in the device of the prior application above identified, the converging disks are arranged for adjustment in the planes of their initial convergence, so as to thereby compensate for diminution in the sizes of the disks due to wear, without changing the angle of the disks in respect to each other. The present application, however, involves a novel arrangement of the disks and the disk adjusting and supporting means in respect to the seed boot or seed delivery spout, all as will be hereinafter more fully disclosed.

In the accompanying drawings which illustrate the invention, like characters indicate like parts throughout the several views.

Figure 1:
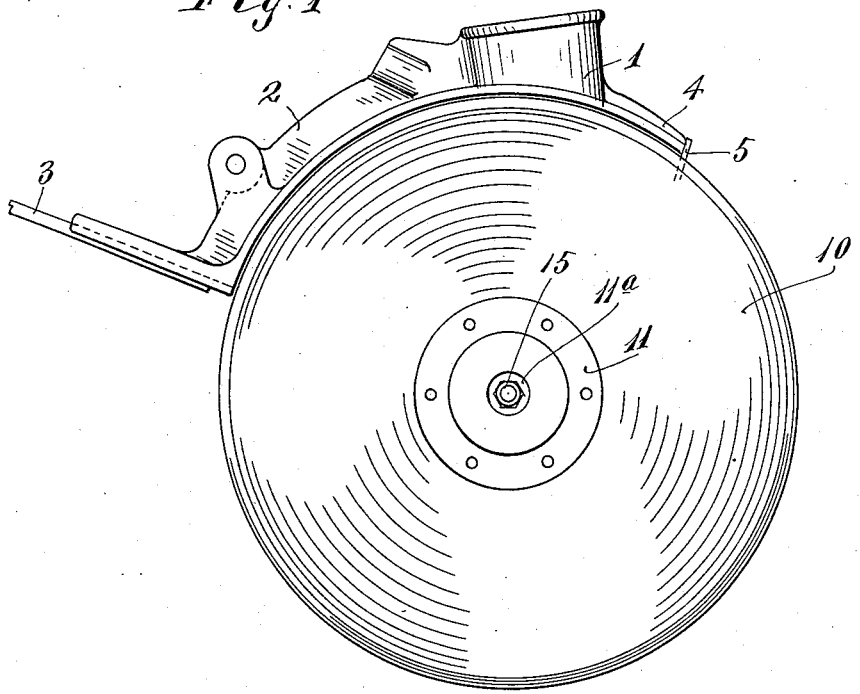
Figure 2:
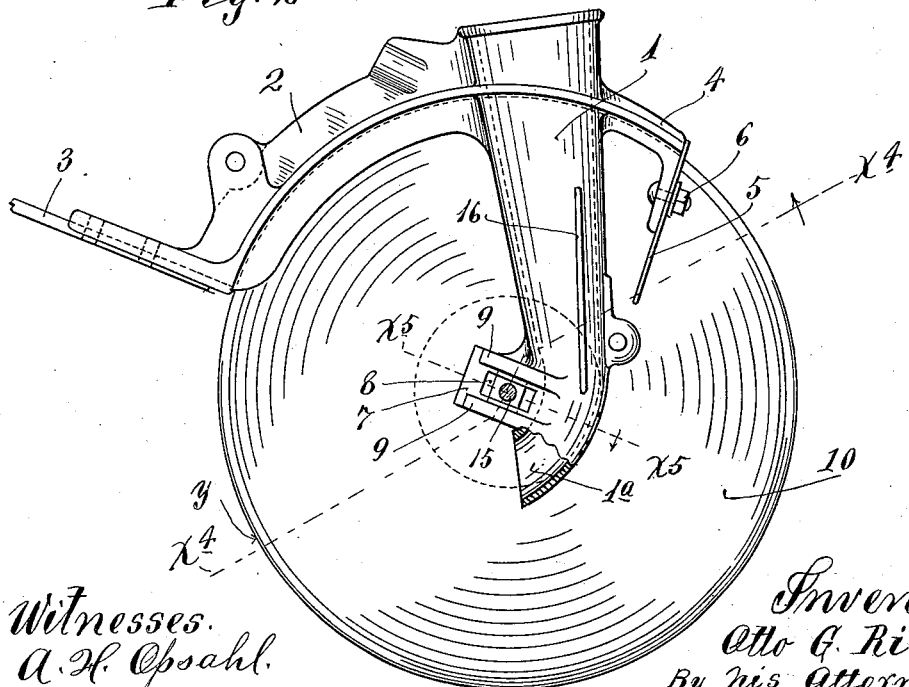

Referring to the drawings, Figure 1 is a side elevation of the improved disk attachment; Fig. 2 is a view corresponding to Fig. 1, with one of the disks removed and with some parts broken away; Fig. 3 is a rear elevation of the disk attachment; Fig. 4 is a transverse section taken on the line $x^4\ x^4$ on Fig. 2; and Fig. 5 is a detail in section taken on the line $x^5\ x^5$ on Fig. 2.

The numeral 1 indicates a seed boot or delivery spout that is cast integral with the flanged arch bar 2 to the front end of which the usual drag bar 3 is rigidly secured in any suitable way. The arch bar 2 has a rearward projection 4 to which an inside scraper 5 is shown as secured by a short nutted bolt 6. The lower end of the seed bolt 1 is curved downwardly and forwardly at $1^a$, for an important purpose which will presently appear. Just above the open lower end of the curved delivery end section $1^a$, the seed boot is provided with an integrally cast forwardly and upwardly projecting bearing or journal lug 7, which is formed with a longitudinal slot 8 and on its opposite faces is provided with parallel upper and lower ribs 9.

The converging disks 10 are provided with laterally offset hub caps 11, the flanges of which are rigidly secured to the outer faces thereof by rivets, or otherwise. The disks are directly journaled on heavy disk-like hubs 12, provided with shoulders 13 and reduced square bosses 14 on their inner faces. The disks 10 are provided with axial perforations that are journaled on the said shoulders 13, and the square bosses 14 of the hubs 12 are located between the flanges 9 of the journal lug 7 of the seed boot 1. The bolt 15, which is slightly crooked, is passed through the hubs 12 and through the slot 8 of the said journal lug 7 and rigidly, but adjustably holds the hubs 12 to the said lug. The head of the bolt 15 is seated in a recess in one of the hubs 12, and the nut $15^a$ thereof is seated in a recess formed in the other hub. The hub caps 11 of the disks 10 are formed with axial perforations $11^a$ so that access may be had with a wrench, either with the head or the butt of the bolt 15. On its opposite sides, the boot 1 is shown as provided with chafing ribs 16 against which the inner faces of the disks are adapted to run, to prevent chattering of the disks and to assist in keeping the same scraped clean.

When the disks 10 are properly set, their converging edges have contact approximately at the point marked $y$ on Fig. 2, and it should be here noted that the inclination of the slot 8 and of the ribs 9 of the journal lug 7 are such that when the disks are diminished in diameter by wear, contact between the converging edges thereof may be maintained by adjusting the journal toward the front extremity of the said slot 8. Adjustment of the journal in the direction stated, not only serves to maintain the disks in contact approximately at the point $y$, but also keeps the front upper portions of the disks in close engagement with the flanges of the arch bar 2. In this way, the disks may be adjusted to compensate for wear and maintain contact between the converging edges thereof without changing the initial angle of the disks in respect to each other, or in respect to the line of movement of the disk attachment. Otherwise stated, the disks are adjusted in the planes of their initial convergence.

The grain or seeds delivered between the disks through the seed boot 1 will, by the downwardly and forwardly curved extremity 1ª thereof, be deflected forwardly, and hence, discharged into the furrow at a point in front of the axes of the disks, where they will be properly deposited in the furrow and properly covered. Furthermore, the said seed boot with its forwardly curved lower end extended below the disk journal, affords a delivery conduit which is closed down to the very point of discharge, to-wit, the point vertically below the disk journal and the journal lug 7. This is highly important because it affords a front delivery with a seed boot or spout extended downward at the rear of the disk journal where the separation of the disks makes possible the use of a seed boot of proper size, and furthermore, that arrangement of the boot prevents the grain from coming into contact with the upwardly moving portions of the disks.

As is well known, it is customary to deliver the seeds or grain through a flexible spout such as a rubber hose or metal ribbon tube which is usually projected through the lower end of the seed boot, the seed boot being terminated at a point too high up for the proper delivery of the seed between the disks. My improved arrangement of the seed boot carries the toe or delivery end of the same to such a point that it is unnecessary to project the seed spout through the seed boot, and the seed boot, therefore, serves to protect the seed spout and to hold the same out of contact with the disks.

The disk attachment constructed on the plan described is strong, cheap and durable, provides for all adjustments of the disks which are desirable to render the disks useful when diminished in size by wear, and is generally efficient for the purpose had in view.

What I claim is:

1. In a double disk attachment, a seed boot having integrally cast therewith a forwardly projecting journal lug located near its lower end, disk journals mounted on said journal lug for forward and rearward adjustments, and forwardly converging disks mounted on said journals and movable thereby on said journal lug in the planes of their initial convergence.

2. In a double disk attachment, a seed boot having integrally cast therewith a forwardly projecting journal lug located near its lower end, disk journals mounted on said journal lug for forward and rearward adjustments, forwardly converging disks mounted on said journals and movable thereby on said journal lug in the planes of their initial convergence, and the lower end of said spout being forwardly and rearwardly curved below said journal lug.

3. In a double disk attachment, a seed boot having integrally cast therewith a forwardly extended arch bar and a forwardly extended journal lug projecting respectively from the upper to the lower extremities thereof, said journal lug having forwardly converging bearing surfaces and forwardly and rearwardly adjustable disk journals, the lower end of said spout being downwardly and forwardly curved below said journal lug and forwardly converging disks mounted on said journals, and by movements of the latter, adjustable in the planes of their initial convergence.

4. In a double disk attachment, a seed boot having integrally cast therewith a forwardly extended arch bar and a forwardly extended journal lug projecting, respectively, from the upper and lower extremities thereof, said journal lug having a longitudinally extended slot, and the lower end of said spout being forwardly and downwardly curved below said journal lug, in combination with a bolt passed through the slot of said journal lug, hubs secured to said journal lug for adjustments longitudinally of the slot thereof, and forwardly converging disks journaled on said hubs, and by the said hubs and bolt, secured for forward adjustments in the planes of their initial convergence to compensate for diminution in size of the disks due to wear.

In testimony whereof I affix my signature in presence of two witnesses.

OTTO GEORGE RIESKE.

Witnesses:
 BERNICE G. WHEELER,
 HARRY D. KILGORE.

---

Copies of this patent may be obtained for five cents each, by addressing the "Commissioner of Patents, Washington, D. C."